July 12, 1927.
J. W. MEADOWCROFT
1,635,583
ELECTRIC WELDING APPARATUS
Filed Aug. 15, 1925
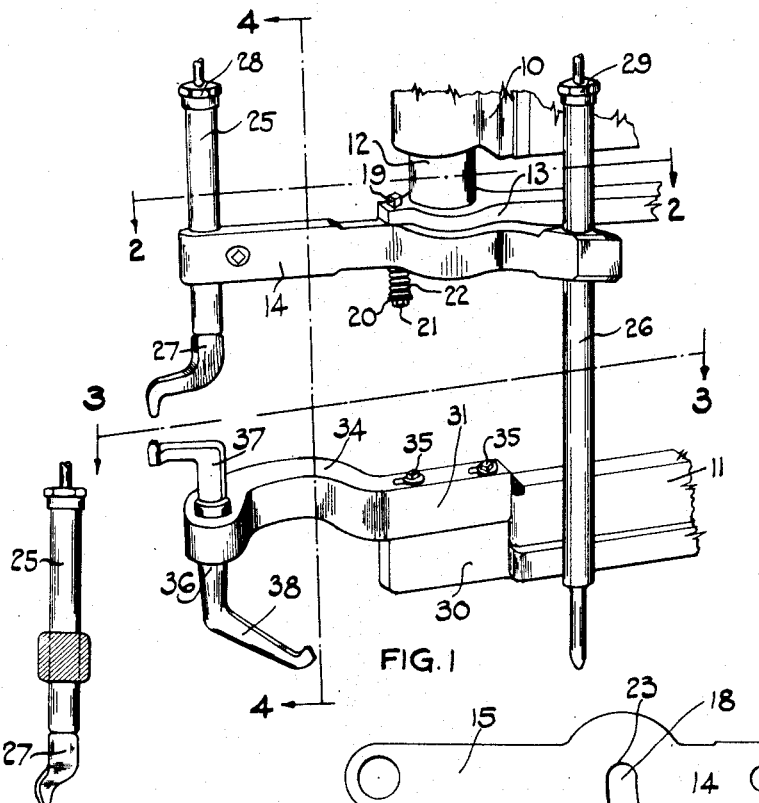
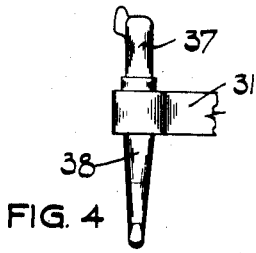
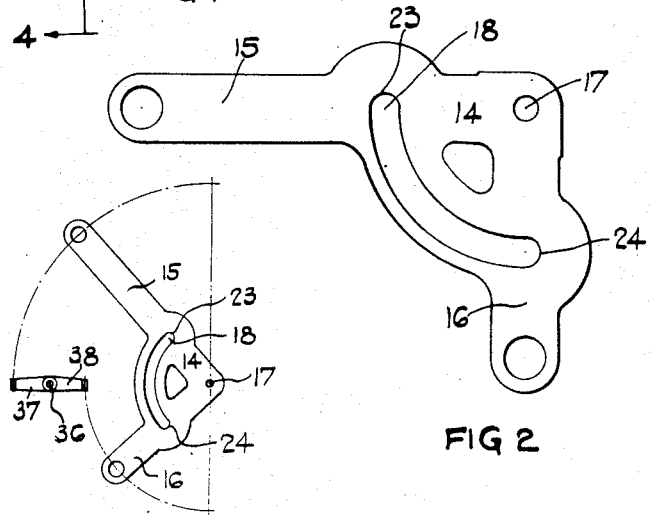
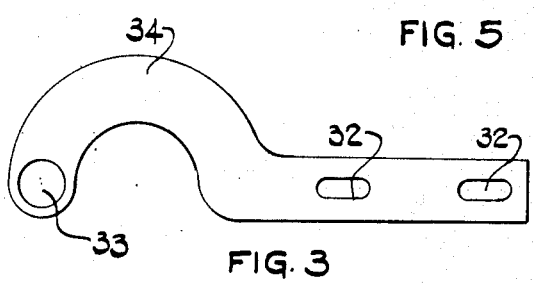
INVENTOR.
JOSEPH W. MEADOWCROFT
BY
ATTORNEY.

Patented July 12, 1927.

1,635,583

UNITED STATES PATENT OFFICE.

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ELECTRIC WELDING APPARATUS.

Application filed August 15, 1925. Serial No. 50,376.

This invention relates to improvements in electric welding machines and has to do more particularly with that type of electric welding machine known as the spot welding machine.

The primary object of this invention is to provide improvements in electric spot welding machines by means of which a plurality of different electrodes may be used in the same machine according to the character of the work to be welded. For ordinary welding operations it is customary to use a straight electrode but it sometimes happens that the shape of the pieces to be welded together is such that the points, at which the welds are to be made, are not accessible to straight electrodes and it is, therefore, necessary to use an electrode which is offset or of some other shape so as to permit the positioning of the pieces with respect to the electrode. In manufacturing operations where a large number of welds are to be made upon pieces of many different shapes as for instance, in the manufacture of automobile body parts, it has been necessary heretofore when the operator wished to weld two pieces of metal together at points which required an offset electrode or an electrode of some other peculiar shape either to change the set-up of the machine by substituting the offset electrode for the straight electrode or to make these welds on a special machine equipped with such offset electrode. The first course requires considerable time and labor. The latter requires a transfer of the work from one machine to the other. The object of this invention is to provide an electric welding machine in which any one of several sets of cooperating electrodes may be used and in which the operator may shift from one set of electrodes to the other when required to do so by the character of the work very quickly and easily.

In this sense this invention is an improvement over that disclosed in the co-pending application, Serial No. 648,680, filed January 30, 1923. In that application it was proposed to mount a shiftable carrier on the fixed arm of the welding machine which is connected to one side of the source of welding current and carries a plurality of electrodes so that by shifting this carrier any one of said electrodes may be brought into operative position. However, in that case a single upper electrode was provided to operate with these shiftable lower electrodes and it was found desirable to provide for lateral movement of the upper electrode so that it could be brought into alignment with the lower electrode with which it was to co-operate. This necessitated two separate steps preparatory to the actual welding step, first the shift from one position to another of the lower electrodes and second, the adjustment of the upper electrode for precise alignment with the lower electrode.

To obviate this disadvantage and to reduce the number of adjustment steps preparatory to welding from the two stated above to a single step this invention contemplates the provision of a pair of fixed electrodes each electrode being positioned in such manner that it is at all times in correct alignment with its cooperating electrode when the latter is shifted into operating position.

This invention consists in substituting for the fixedly mounted electrode in the upper reciprocable arm a shiftably mounted carrier for a plurality of electrodes. Upon the lower fixed arm of the welding machine is mounted a carrier for a plurality of electrodes, this carrier differing from the upper carrier in that it is fixedly secured in adjusted position on the lower arm. The lower carrier, as has just been explained, carries a plurality of electrodes which are arranged in such manner that each is adapted to co-act with one of the electrodes carried by the shiftable upper carrier when any one of these upper electrodes are moved into the welding position. By virtue of this arrangement it will be seen that only one adjustment is necessary when the operator desires to change from one side of the electrodes to the other, it being only necessary to shift the upper carrier from one position to another, the alignment of the upper and lower coacting electrodes being automatically assured by reason of the particular position and arrangement of the lower fixed electrodes.

Other objects and objects relating to details and economies of construction and of operation will definitely appear from the detailed description to follow. A structure constituting a preferred embodiment of this invention is illustrated in the accompanying drawings, forming a part of this specification.

Fig. 1 is a view in perspective showing the upper and lower electrodes and their carriers as embodied in this invention.

Fig. 2 is a plan view of the swingable upper electrode carrier looking in the direction of the arrows 2—2 of Fig. 1.

Fig. 3 is a plan view of the stationary lower electrode carrier looking in the direction of the arrows 3—3 of Fig. 1.

Fig. 4 is a view showing the outer set of electrodes taken on the line 4—4 of Fig. 1.

Fig. 5 is a diagrammatic plan view showing the arcs of travel of the upper electrodes.

In the drawings the same reference numerals refer to the same parts throughout. Referring to the drawings in which there is illustrated a preferred embodiment of the invention the welding machine (not shown) is provided with an upper arm 10 and a lower arm 11. A plunger 12 is mounted at the end of the arm 10 and is adapted to be reciprocated vertically by any suitable means. The lower end of the plunger 12 carries a bar 13 which is connected electrically to one side of the welding transformer (not shown). The lower fixed arm 11 is substantially vertically aligned with respect to the upper reciprocable arm 10 and is connected to the other side of said welding transformer. At the outer end of the upper arm 13 there is provided a support for a laterally shiftable electrode carrier 14. This electrode carrier in this instance is in the form of a bell crank having the arms 15 and 16 disposed substantially at right angles to one another. It will be noticed that the arm 16 is of considerably shorter length than the arm 15, for a purpose which will be apparent from the description which follows. This bell crank is provided with an aperture 17. A bolt passing through this aperture 17 and into the arm 13 provides a pivotal support for the bell crank electrode carrier. Extending substantially from the base of one arm to the base of the other arm of the bell crank electrode carrier is an arcuated slot 18 which serves the triple purpose of insuring good electrical contact between the arm 13 and the electrode carrier 14, providing a guide during the laterally shifting movement of the electrode carrier and providing a means for limiting the throw of said carrier.

A bolt 19 which passes through the outer end of the arm 13 and through the slot 18 extends downwardly some distance below the upper electrode carrier, as is best shown in Fig. 1. A spring 20 is interposed between the lower surface of the carrier 14 and the washer 21 carried on the lower extremity of the bolt by the nut 22. This spring 20 serves the purpose of yieldingly holding the bell crank 14 in intimate contact with the lower surface of the arm 13 so as to maintain good electrical contact between these two parts no matter in what position the carrier may be with respect to the arm 13. The bolt 19 serves the purpose also of limiting the swinging movement of the electrode carrier 14 about its pivotal axis 17 by virtue of its engagement with either wall 23 or 24 of the slot 18 depending upon the position into which the carrier is thrown. At the outer end of the arm 15 of the carrier the electrode 25 is mounted while at the outer end of the arm 16 is mounted the electrode 26. The electrode 25 is shown as being provided with a removable point or die 27 of the offset type while the electrode 26 is of the straight and usual type. Each of the electrodes 25 and 26 are provided with connections 28 and 29, respectively, whereby they may connect with a source of water supply or other cooling medium for purposes of cooling the electrodes. It is within the contemplation of this invention to connect these electrodes in series in the cooling system so that the cooling fluid may flow into one of the electrodes and then from it into another electrode and thence to the point of discharge.

At the outer end of the lower fixed arm 11 there is provided a projection 30 having a plane upper surface upon which is adapted to rest the lower electrode carrier 31. Fig. 3 shows a plan view of this lower carrier and it will be seen that the mounting end thereof is provided with a pair of elongated slots 32 while the free or outer end thereof is provided with an aperture 33. The portion just within the aperture 33 is offset to form substantially a semi-circular projection 34 for a purpose to be described hereinafter. Bolts 35 pass through the slots 32 and into the projection 30 of the arm 11 whereby the carrier 31 is securely held in position. The slotted apertures 32 however provide for an adjustment inwardly or outwardly with respect to the machine such that an initial setting of the electrodes may be made depending upon the particular type of lower electrode which is to be used. Secured in any suitable manner within the aperture 33 is a double electrode 36 having an upper electrode point 37 and an inwardly offset lower electrode point 38. This double electrode 36 is clamped in position in the carrier 31 by any suitable clamping means, the respective positions of the electrode points 37 and 38 having first been determined by the operator. It will thus be seen that the lower electrodes are relatively fixed in place after their initial adjustment has been made. Depending entirely upon the particular class of work which is to be done the lower electrodes may be changed and others substituted in their places easily and conveniently. Similarly the upper electrodes are removable and depending upon the particular circumstances may be removed in order that new or different electrodes may be substituted in their place.

The operation of the welding machine will now be readily understood. The electrodes 25 and 37 form one set of cooperating electrodes capable of performing the welding operation upon work which is so shaped that it may be positioned between the welding points 27 and 37. The electrodes 26 and 38 form the second set of cooperating electrodes capable of performing work which is shaped to permit its reception between the electrodes of this last mentioned set. In Fig. 1 the first set of cooperating electrodes, that is, that comprising the electrodes 25 and 37, is shown to be in operative position. The welding is accomplished in the usual manner by reciprocating the plunger 12 so as to bring the upper die 27 into contact with the upper surface of the pieces to be welded together in alignment with the die 37 carried by the lower electrode. The semi-circular offset 34, located as it is to one side of the first welding axis, provides an adequate clearance for the work and so effectually precludes any interference during the welding operations. It is often the case that the welding operation cannot be successfully carried out with electrodes shaped like the electrodes 27 and 37. It then becomes necessary merely to loosen the nut 22 so that the upper shiftable carrier 14 may be shifted laterally through the extent of its arcuate slot 18 after which the nut 22 is tightened again and the electrode 26 is found to be in precise alignment with the point of the lower electrode 38. When in this second position that work which cannot be accomplished with the first set of electrodes may now be accomplished with ease and facility.

It will be noticed that there is no interference whatever between the several pairs of electrodes. Arrangement is such that an adequate clearance is allowed between the electrodes which are not in operative position. For instance, in Fig. 1 it will be seen that the electrode 26 is at considerable distance from the operating end of the welding machine so that it does not interfere with any work in the welding zone. Similarly, upon shifting the electrode carrier 14 to bring the electrode 26 into operative position the electrode 25 is thrown far out of operative position so that it is entirely without the zone of the welding operation. This too gives greater freedom for work insertion, it being possible to insert the work in place over the lower electrode before the corresponding upper electrode is moved into place.

What I claim as new and useful is:—

1. In an electric welding machine, in combination, a reciprocable carrier for a plurality of electrodes, a fixed carrier for a plurality of electrodes corresponding to said first mentioned electrodes, and means to effect a cooperative relationship between corresponding reciprocable and fixed electrodes simultaneously with the destruction of a similar relationship between any of the other corresponding electrodes.

2. In an electric welding machine, in combination, a laterally shiftable carrier, and a plurality of spaced electrodes mounted upon said carrier and arranged such that by shifting said carrier from one extreme position to another separately located and alternative welding axes are established.

3. In an electric welding machine, in combination, a pair of relatively movable welding arms, a carrier mounted on each of said arms, each of said carriers carrying a plurality of electrodes whereby to constitute a plurality of welding sets operable along different welding axes, and means for effectually preventing the establishment of more than one of said welding axes at any one time.

4. In an electric welding machine, in combination, a pair of relatively movable welding arms, a plurality of electrodes carried by each of said arms, said electrodes presenting welding points spaced from each other, and means for independently establishing separate welding axes, said axes being spaced from each other but located in substantially the same vertical plane.

5. In an electric welding machine, in combination, an upper carrier for a plurality of electrodes asymmetrically arranged thereon, a lower carrier for a corresponding number of relatively offset electrodes, and means for moving one of said asymmetrically arranged electrodes into welding position with respect to one of said relatively offset electrodes.

6. In an electric welding machine, in combination, an upper carrier for a plurality of electrodes asymmetrically arranged thereon, a lower carrier for a corresponding number of relatively offset electrodes, and means for moving one of said asymmetrically arranged electrodes into welding position with respect to one of said relatively offset electrodes simultaneously as the other of said asymmetrically arranged electrodes is moved out of welding position with respect to the other of said relatively offset electrodes.

7. In an electric welding machine, in combination, an upper carrier for a plurality of electrodes asymmetrically arranged thereon, a lower carrier for a corresponding number of relatively offset electrodes, and means for moving one of said asymmetrically arranged electrodes into welding position with respect to one of said relatively offset electrodes, and means for longitudinally adjusting said lower carrier.

8. In an electric welding machine, in combination, a laterally swingable carrier for a plurality of electrodes, a fixed carrier for a corresponding number of electrodes, and means on said swingable and said fixed carriers whereby independent welding axes are established.

9. In an electric welding machine, in combination, a laterally swingable carrier for a plurality of electrodes, a fixed carrier for a corresponding number of electrodes, and means on said swingable and said fixed carriers whereby independent welding axes are established, said welding axes being spaced from, but parallel to each other.

10. In an electric welding machine, in combination, a swingably mounted electrode carrier having diverging arms of unequal length, an electrode carried at the outer ends of each of said arms, a fixed carrier having an offset body portion, and a pair of electrodes carried at the outer end of said fixed carrier, one of said pair of electrodes cooperating with one of said first mentioned electrodes and the other of said pair of electrodes cooperating with the other of said first mentioned electrodes when said swingably mounted carrier is positioned respectively with one or the other of its divergent arms in substantial alignment with said fixed carrier.

11. In an electric welding machine, in combination, a pair of relatively movable welding arms, a carrier fixed to one of said arms, a laterally shiftable carrier mounted upon the other of said arms, a plurality of electrodes carried by said fixed carrier, said electrodes having the welding points thereof relatively offset, and a pair of electrodes carried by said shiftable carrier, each of said pair of electrodes being adapted to be alternately shifted into position to cooperate with one or the other of said relatively offset welding points.

12. In an electric welding machine, in combination, a pair of relatively movable welding arms, a carrier pivotally mounted at the forward end of one of said arms, said carrier having a pair of diverging arms of different lengths, a second carrier fixed to the other of said arms and extending forwardly therefrom, a pair of electrodes carried by each of said carriers, and means effective to permit the establishment of alternate, separately located welding axes by the alignment of one or the other of said diverging arms with respect to said fixed, forwardly extending carrier.

13. A carrier for welding electrodes or the like having a plurality of divergent arms, said arms being of unequal length and having passageways for the reception of electrodes at the outer ends of said arms.

14. A carrier for welding electrodes or the like having a plurality of divergent arms, said arms being of unequal length and having passageways for the reception of electrodes at the outer ends of said arms, and means whereby said carrier is adapted to be pivotally supported for lateral movement of said arms to bring one or the other of said electrodes into welding position.

15. In a welding machine, in combination, a pair of relatively movable welding arms, a swingably mounted electrode carrier mounted on one of said arms, said carrier being provided with a pair of branches of unequal length extending substantially at right angles to each other, and said carrier being mounted in such manner as to throw either one or the other of said branches forwardly of but in substantially longitudinal alignment with the arm of the machine.

16. In an electric welding machine, in combination, an electrode carrier adapted for lateral shifting, said carrier having diverging arms of unequal length, electrodes carried at the outer ends of said arms, a second electrode carrier fixed in position, said fixed carrier having an offset portion adjacent its outer end, and a pair of electrodes carried by said fixed carrier, one of said latter electrodes being rearwardly offset for disposition substantially beneath the geometrical center of said offset portion of the fixed carrier for coaction with the electrode carried by the short arm of the shiftable carrier whereby separate and independent welding axes are established with never more than a single pair of electrodes in welding position at the same time.

17. In an electric welding machine, a fixed electrode carrier and a shiftable electrode carrier, said shiftable electrode carrier being provided with a plurality of electrodes adapted to travel through concentric arcs during shifting movement of the carrier, whereby a plurality of independent welding axes may be effected.

18. In an electric welding machine a fixed carrier provided with a plurality of electrodes, a shiftable carrier provided with a corresponding number of electrodes adapted to travel through spaced concentric arcs during shifting movement of the carrier, said electrodes on said fixed carrier being offset with respect to each other a distance equal to the distance between the arcs through which said electrodes on said shiftable carrier travel during movement thereof.

19. In an electric welding machine, a fixed electrode carrier provided with a plurality of electrodes, a shiftable electrode carrier provided with a corresponding number of electrodes, the electrodes on said shiftable carrier being arranged at the extremities of divergent arms so as to describe concentric spaced arcs during the shifting movement of the carrier, whereby each electrode of the shiftable carrier may be selectively brought into registry with a cooperating electrode of the fixed carrier thus creating a plurality of independent welding axes spaced apart a distance equal to the distance between the arcs.

In testimony whereof I hereunto affix my signature.

JOSEPH W. MEADOWCROFT.